United States Patent
Min et al.

(10) Patent No.: US 11,495,781 B2
(45) Date of Patent: Nov. 8, 2022

(54) SYSTEM AND METHOD FOR MANUFACTURING POSITIVE ELECTRODE FOR SECONDARY BATTERY

(71) Applicants: Hyundai Motor Company, Seoul (KR); Kia Motors Corporation, Seoul (KR)

(72) Inventors: SeungJun Min, Bucheon-si (KR); Sung Hoon Jeong, Seoul (KR); Hyoup Je Cho, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/145,600

(22) Filed: Jan. 11, 2021

(65) Prior Publication Data
US 2022/0045309 A1 Feb. 10, 2022

(30) Foreign Application Priority Data
Aug. 5, 2020 (KR) .................. 10-2020-0097822

(51) Int. Cl.
| | |
|---|---|
| H01M 4/04 | (2006.01) |
| B05C 1/08 | (2006.01) |
| B05C 3/12 | (2006.01) |
| B05C 9/14 | (2006.01) |
| H01M 4/36 | (2006.01) |
| H01M 4/62 | (2006.01) |
| H01M 4/02 | (2006.01) |

(52) U.S. Cl.
CPC ............ *H01M 4/0409* (2013.01); *B05C 1/08* (2013.01); *B05C 3/125* (2013.01); *H01M 4/0411* (2013.01); *H01M 4/0471* (2013.01); *H01M 4/366* (2013.01); *H01M 4/628* (2013.01); *H01M 2004/028* (2013.01)

(58) Field of Classification Search
USPC ....... 118/248, 249, 258, 261, 262, 300, 410, 118/304, 66, 58
See application file for complete search history.

(56) References Cited

U.S. PATENT DOCUMENTS

| | | | |
|---|---|---|---|
| 2017/0259552 A1* | 9/2017 | Kang | ............... B32B 39/00 |
| 2019/0081317 A1* | 3/2019 | Keil | ................. B05C 9/12 |
| 2019/0123341 A1* | 4/2019 | Ikeda | ............... B65H 23/32 |

FOREIGN PATENT DOCUMENTS

| | | | | |
|---|---|---|---|---|
| KR | 20150098445 A | | 8/2015 | |
| WO | WO-2015145806 A1 | * | 10/2015 | ......... H01M 10/04 |

* cited by examiner

*Primary Examiner* — Yewebdar T Tadesse
(74) *Attorney, Agent, or Firm* — Slater Matsil, LLP

(57) ABSTRACT

A system for manufacturing a positive electrode for a secondary battery includes an unwinder wound with a positive electrode base material, a first coating unit for coating an insulating material at predetermined positions about widthwise edges of the base material with respect to a transfer direction of the base material supplied from the unwinder, a first drying furnace for drying the insulating material by heating the base material coated with the insulating material, a second coating unit for coating a positive electrode slurry on the base material supplied from the first drying furnace in a region between the insulating material formed at both sides of the base material, and a second drying furnace for heating and drying the base material coated with the insulating material and the positive electrode slurry.

20 Claims, 6 Drawing Sheets

SYSTEM AND METHOD FOR MANUFACTURING POSITIVE ELECTRODE FOR SECONDARY BATTERY

CROSS-REFERENCE TO RELATED APPLICATIONS

This application claims the benefit of Korean Patent Application No. 10-2020-0097822, filed in the Korean Intellectual Property Office on Aug. 5, 2020, which application is hereby incorporated herein by reference.

TECHNICAL FIELD

The present invention relates to a system and method of manufacturing a positive electrode for a secondary battery.

BACKGROUND

In general, secondary batteries may be classified according to the structure of the electrode assembly of the positive electrode, separator, and negative electrode.

For example, the secondary battery may be classified into a jelly roll-type (winding-type) electrode assembly where a lengthy combined sheet of positive and negative electrodes interposing a separator are wound, or a stack-type electrode assembly where positive and negative electrodes interposing a separator having a predetermined size are stacked.

Recently, a pouch-type battery of a structure in which the stack-type electrode assembly is built into a pouch-type battery case of an aluminum laminate sheet has been attracting a lot of attention due to low manufacturing cost, low weight, and easy shape transformation.

The stack-type electrode assembly is formed by stacking combined sheets where a separator is interposed between positive and negative electrodes having protruding electrode leads. When an internal temperature is increased due to an exposure to an exterior heat source, an internal short circuit, etc., the positive and negative electrodes may partially contact each other through the separator, thereby causing a short circuit.

Particularly, when the separator contracts due to an abnormal condition, the protruded electrode leads of the positive or negative electrodes may come into contact with an electrode of a different polarity. This phenomenon may substantially deteriorate the safety of the secondary battery, as well as shortening cycle-life of the battery.

Thus, in order to solve the above problems, a technology was developed to block contact with the negative electrode by forming an insulating portion at a predetermined position on the positive electrode, which is relatively larger in size than the negative electrode.

The insulating portion formed on the positive electrode is formed between the electrode portion and the electrode lead of the positive electrode, and precision is required.

In addition, precision is also required in forming the electrode portion that contacts the insulating portion.

The above information disclosed in this Background section is only for enhancement of understanding of the background of the invention, and therefore it may contain information that does not form the prior art that is already known to a person of ordinary skill in the art.

SUMMARY

An exemplary system for manufacturing a positive electrode for a secondary battery includes an unwinder wound with a positive electrode base material, a first coating unit configured to coat an insulating material at predetermined positions about widthwise edges with respect to a transfer direction of the positive electrode base material supplied from the unwinder, a first drying furnace configured to dry the insulating material by heating the positive electrode base material coated with the insulating material, a second coating unit configured to coat a positive electrode slurry between the insulating materials on the positive electrode base material supplied from the first drying furnace, and a second drying furnace configured to heat and dry the positive electrode base material coated with the insulating material and the positive electrode slurry.

The first coating unit may include a pan configured to store the insulating material in a liquid state, and a gravure roll rotatably disposed within the pan through a rotation shaft, and forming a coating surface formed on an exterior circumference so as to transfer the insulating material to the positive electrode base material to form an insulating portion.

The gravure roll may be installed to be immersed in the insulating material within the pan and may form the coating surface at each exterior circumference at both sides of the gravure roll.

The coating surface may be symmetrically formed with respect to a center of the gravure roll, through intaglio molding.

The predetermined positions on the positive electrode base material to be coated with the insulating material may be positioned between an electrode portion formed at a central portion of the positive electrode and lead portions formed at both ends of the positive electrode.

The second coating unit may include a slot die coater configured to coat the positive electrode slurry supplied through an internal passage on the positive electrode base material through a nozzle.

The slot die coater may be configured to set a coating thickness of the positive electrode slurry by adjusting a gap with respect to the positive electrode base material and to form a positive electrode portion by applying the positive electrode slurry between the insulating material on both sides formed on the positive electrode base material.

An exemplary system may further include a re-winder configured to recollect a positive electrode film formed by coating and drying the insulating material and the positive electrode slurry on the positive electrode base material, by winding the positive electrode film into the form of a roll.

An exemplary method for manufacturing a positive electrode for a secondary battery includes unwinding a positive electrode base material wound on an unwinder and transferring the unwound base material to a first coating unit through a plurality of rollers, coating, by the first coating unit, an insulating material at predetermined positions on both sides of the positive electrode base material with respect to the transfer direction of the positive electrode base material, drying the insulating material to form insulating portions, while passing the positive electrode base material through a first drying furnace, coating, by a second coating unit, a positive electrode slurry between the insulating portions of the positive electrode base material that has passed the first drying furnace, and drying the positive electrode slurry to form a positive electrode film formed with a positive electrode portion on the positive electrode base material, while passing the positive electrode base material through a second drying furnace.

The coating of the insulating material at the predetermined positions may include rotating a gravure roll immersed in the insulating material accommodated in a pan so as to take the insulating material on coating surfaces formed on an exterior circumference of the gravure roll, and coating the insulating material at the predetermined positions of the positive electrode base material corresponding to the coating surfaces by the rotation of the gravure roll through a contact between the gravure roll and the positive electrode base material.

The insulating material may be coated between an electrode portion formed at a central portion of the positive electrode and lead portions formed at both ends of the positive electrode.

The coating of the positive electrode slurry between the insulating portions may include adjusting a gap between the positive electrode base material and a slot die coater, and supplying the positive electrode slurry to the positive electrode base material through an internal passage of the slot die coater, so as to coat the positive electrode slurry on the positive electrode base material through a nozzle.

An exemplary method may further include transferring the positive electrode film through a plurality of rollers, so as to be recollected by a re-winder.

According to an exemplary system and method for manufacturing a positive electrode for a secondary battery, the insulating material in a liquid state is applied on the base material by the first coating unit, the insulating material is dried to form the insulating portion by the first drying furnace, and then the positive electrode slurry is applied between the insulating portions, thereby preventing mixing of the insulating material and the positive electrode slurry.

In addition, according to an exemplary system and method for manufacturing a positive electrode for a secondary battery, the gravure roll is employed to the first coating unit, thereby providing an advantage of easy control of the size of the insulating portion that requires preciseness.

Other effects that may be obtained or are predicted by an exemplary embodiment will be explicitly or implicitly described in a detailed description of exemplary embodiments of the present invention. That is, various effects that are predicted according to an exemplary embodiment will be described in the following detailed description.

Figure 1A:
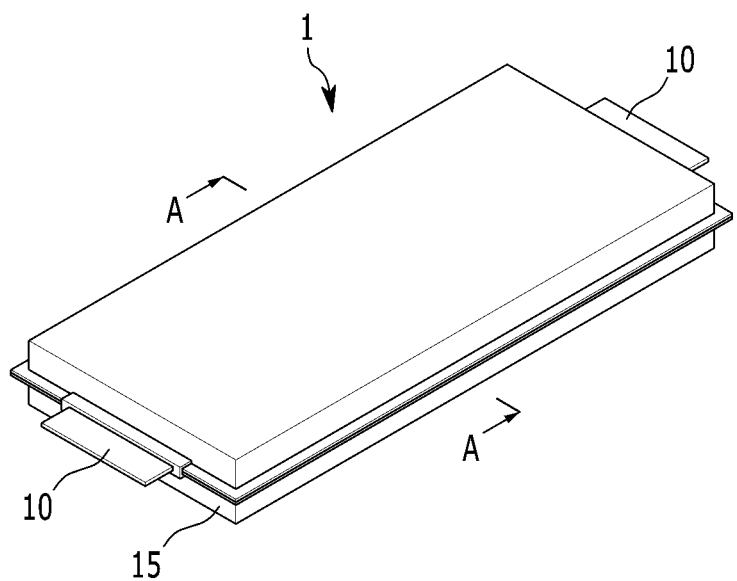
FIG. 1A is a schematic diagram of a secondary battery including a positive electrode according to an exemplary embodiment.

The following reference numerals can be used in conjunction with the drawings:
1: secondary battery
3: negative electrode
300: negative electrode base material
5: separator
7: positive electrode
700: positive electrode base material
10: lead portion
11: insulating portion
13: electrode portion
15: pouch
17: insulating material
19: positive electrode slurry
20: unwinder
30: first coating unit
31: pan
32: storage tank
33: mixer
34: supply hose
35: adjustment valve
36: gravure roll
37: rotation shaft
38: coating surface
39: blade
40: first backup roll
50: first drying furnace
51, 71: heating chamber
53, 73: duct
60: second coating unit
61: slot die coater
63: internal passage
65: nozzle
67: second backup roll
70: second drying furnace
80: re-winder
90: positive electrode film

DETAILED DESCRIPTION OF ILLUSTRATIVE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In order to clarify the present invention, parts that are not related to the description will be omitted, and the same elements or equivalents are referred to with the same reference numerals throughout the specification.

In the following description, dividing names of components into first, second, and the like is to divide the names because the names of the components are the same as each other, and an order thereof is not particularly limited.

A system and method for manufacturing a positive electrode for a secondary battery according to an exemplary embodiment may be applied for a positive electrode included in a secondary battery.

Figure 1B:
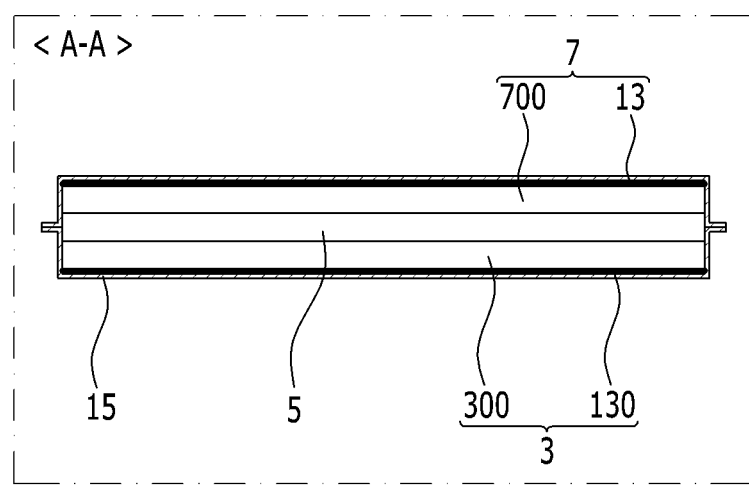
FIG. 1B is a cross-sectional view of the secondary battery taken along line A-A of FIG. 1A.
Figure 2:
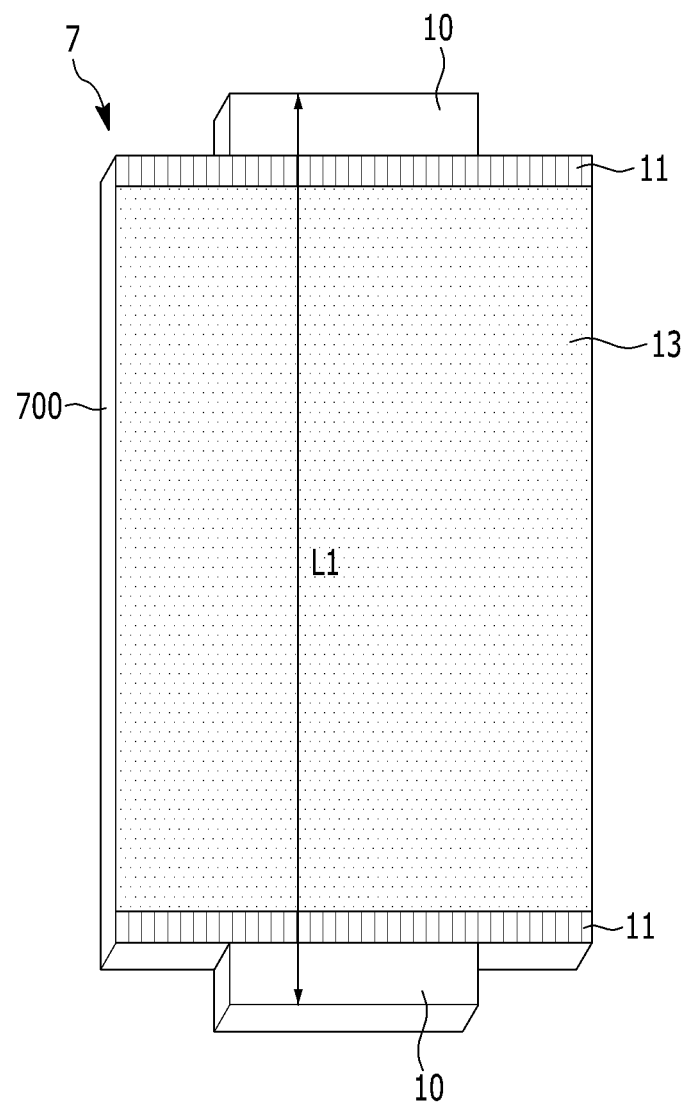
FIG. 2 is a schematic diagram of a positive electrode according to an exemplary embodiment.

FIG. 1A is a schematic diagram of a secondary battery including a positive electrode according to an exemplary embodiment, FIG. 1B is a cross-sectional view of the secondary battery taken along line A-A of FIG. 1A, and FIG. 2 is a schematic diagram of a positive electrode according to an exemplary embodiment.

Referring to FIG. 1A, FIG. 1B, and FIG. 2, a secondary battery 1 includes a negative electrode 3, a separator 5, and a positive electrode 7 that are sequentially stacked, and may be packaged into a pouch 15.

Although only one assembly of the negative electrode 3, the separator 5, and the positive electrode 7 is illustrated within the pouch 15, it may be understood that there may be several or many such assemblies within the pouch 15.

Lead portions 10 are formed at both sides of the pouch 15, so as to supply or receive electricity.

The negative electrode 3 is formed within the pouch 15 and between the lead portions 10, and includes a negative electrode base material 300 and a negative electrode portion 130 on the negative electrode base material 300.

Similarly, the positive electrode 7 is formed within the pouch 15 and between the lead portions 10, and includes a positive electrode base material 700 and a positive electrode portion 13 on the positive electrode base material 7.

The separator 5 is interposed between the negative electrode 3 and the positive electrode 7.

The secondary battery 1 may have different lengths for the negative electrode 3 and the positive electrode 7. For example, the length of the negative electrode 3 may be formed shorter than the length L1 of the positive electrode 7.

When the negative electrode 3 and the positive electrode 7 overlap each other while the negative electrode 3 and the positive electrode 7 are formed in different lengths, the negative electrode portion 130 of the negative electrode 3 and the lead portion 10 of the positive electrode 7 may contact with each other, possibly causing a problem of forming a short circuit.

A system and method for manufacturing a positive electrode according to an exemplary embodiment intends to prevent such a problem, and may be applied to manufacturing of the positive electrode 7.

Figure 3:
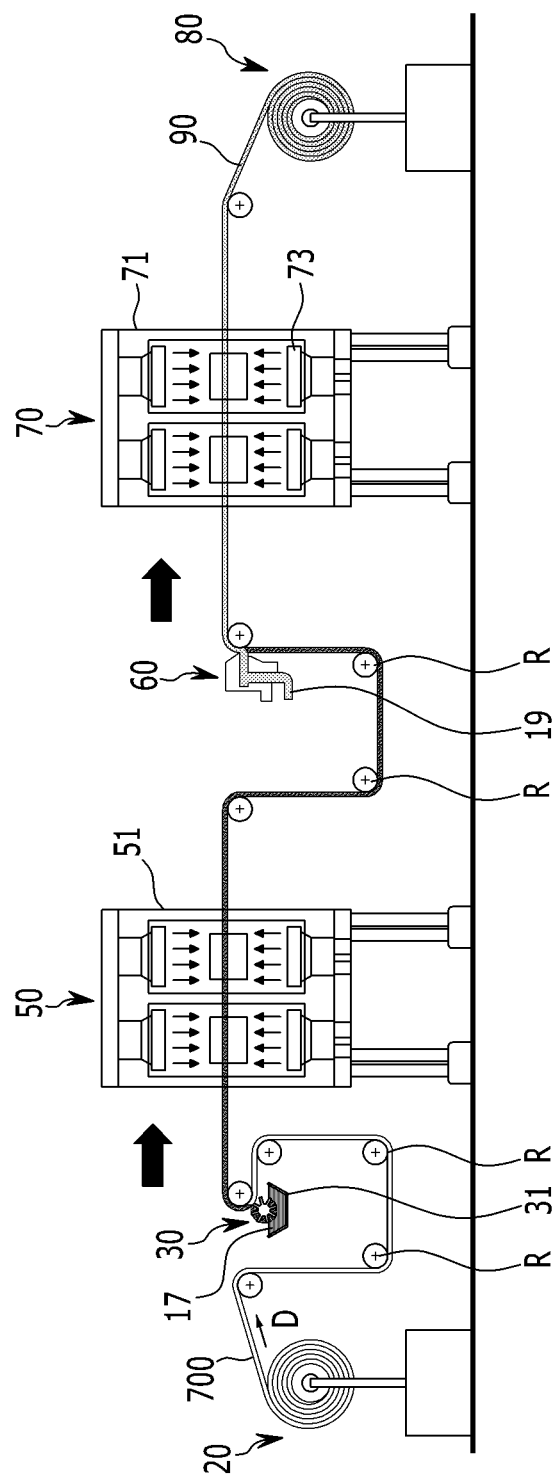
FIG. 3 is an entire schematic diagram of a system for manufacturing a positive electrode according to an exemplary embodiment.
Figure 4:
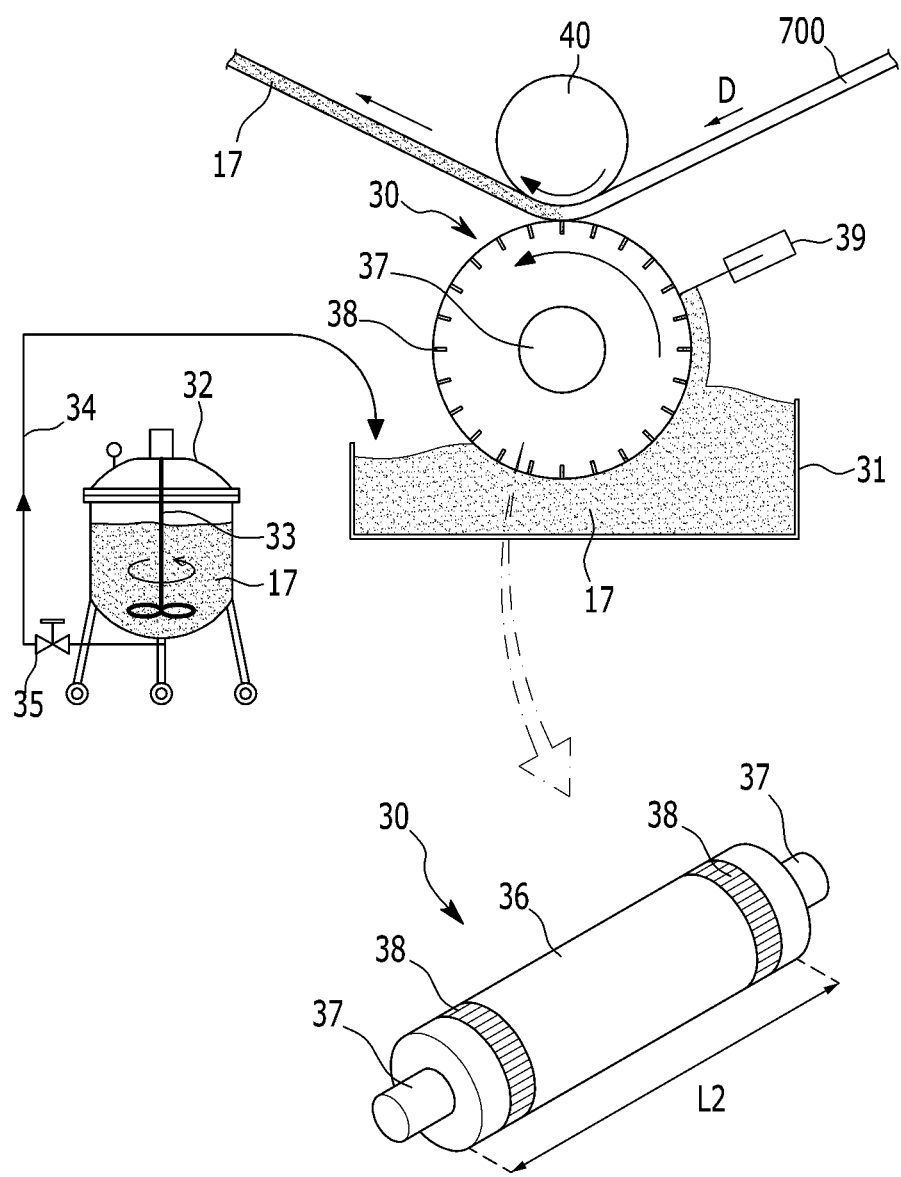
FIG. 4 is a schematic diagram of a first coating unit applied to a system for manufacturing a positive electrode according to an exemplary embodiment.
Figure 5:
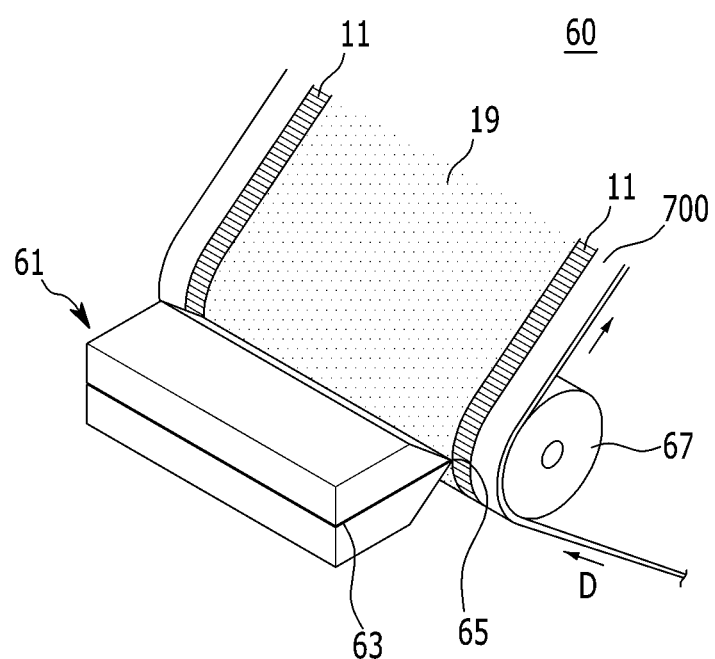
FIG. 5 is a schematic diagram of a second coating unit applied to a system for manufacturing a positive electrode according to an exemplary embodiment.

FIG. 3 is an entire schematic diagram of a system for manufacturing a positive electrode according to an exemplary embodiment, FIG. 4 is a schematic diagram of a first coating unit applied to a system for manufacturing a positive electrode according to an exemplary embodiment, and FIG. 5 is a schematic diagram of a second coating unit applied to a system for manufacturing a positive electrode according to an exemplary embodiment.

Referring to FIG. 3, a system for manufacturing a positive electrode includes an unwinder 20, a first coating unit 30, a first drying furnace 50, a second coating unit 60, a second drying furnace 70, and a re-winder 80, which are disposed in a listed order, so as to manufacture the positive electrode 7 by processing the positive electrode base material 700.

In the present exemplary embodiment, the positive electrode base material 700 is wound around a roll in the unwinder 20.

For example, the positive electrode base material 700 may contain an aluminum foil (Al-foil).

The unwinder 20 is configured to release and supply the positive electrode base material 700.

The first coating unit 30 is disposed at the rear of the unwinder 20.

Referring to FIG. 4, the first coating unit 3 coats an insulating material 17 on a side of the positive electrode base material 700 supplied from the unwinder 20 through a plurality of rollers, at predetermined positions about widthwise edges with respect to a transfer direction D of the positive electrode base material 700.

Here, the predetermined position is positioned between the lead portion 10 formed at both ends of the positive electrode 7 and the positive electrode portion 13 formed at a central portion of the positive electrode 7.

The first coating unit 30 includes a pan 31 accommodating the insulating material 17 in a liquid state, and a gravure roll 36 installed so as to be immersed in the insulating material 17 within the pan 31.

The pan 31 has a concave bowl shape so as to store the insulating material 17 that is continuously supplied from a separate storage tank 32.

At this time, the insulating material 17 is supplied to the pan 31 through an adjustment valve 35 installed on a supply hose 34 connected to the pan 31, and the storage tank 32 mixes the stored insulating material 17 by a mixer 33 disposed inside.

In addition, the gravure roll 36 is formed in a cylinder shape having a length L2 corresponding to the length L1 (refer to FIG. 2) of the positive electrode base material 700, and is rotatably disposed within the pan 31 through a rotation shaft 37.

The gravure roll 36 forms a coating surface 38 at each exterior circumference at both sides of the gravure roll 36, symmetrically with respect to a center of the gravure roll 36.

In addition, the gravure roll 36 is configured to coat the insulating material 17 on the positive electrode base material 700 through the coating surface 38.

At this time, the coating surface 38 is formed through intaglio molding of a predetermined shape on the exterior circumference of the gravure roll 36.

That is, the gravure roll 36 may form the shape of an insulating portion 11 differently according to the shape of the intaglio during the intaglio molding.

In addition, a blade 39 that contacts the exterior circumference is installed on the gravure roll 36. The blade 39 is for allowing the insulating material 17 to remain only in the intaglio of the coating surface 38 on the exterior circumference of the gravure roll 36.

The gravure roll 36 rotates with a first backup roll 40, and the insulating portion 11 is formed while the coating surface 38 having the insulating material 17 contacts the positive electrode base material 700.

Referring back to FIG. 3, the first drying furnace 50 is disposed at the rear of the first coating unit 30.

In the present exemplary embodiment, the first drying furnace 50 heats the positive electrode base material 700 coated with the insulating material 17 in the liquid state, so as to dry the insulating material 17.

The first drying furnace 50 includes a heating chamber 51, and while the positive electrode base material 700 passes through the heating chamber 51, the insulating material 17 in the liquid state is dried by high temperature wind inflowing through a duct 53.

While the positive electrode base material 700 passes through the first drying furnace 50, the insulating material 17 is dried to form the insulating portion 11.

The first drying furnace 50 may be formed in a known configuration, and a detailed description thereof will be omitted.

The second coating unit 60 is disposed at the rear of the first drying furnace 50.

Referring to FIG. 5, the second coating unit 60 coats a positive electrode slurry 19 on the positive electrode base material 700, more specifically, between the insulating portions 11 formed by drying of the insulating material 17.

For example, the positive electrode slurry 19 is formed of an electrically conductive material in a gel-state.

The second coating unit 60 may include a slot die coater 61 that coats the positive electrode slurry 19 supplied through an internal passage 63 to the positive electrode base material 700 through a nozzle 65.

While rotating with the second backup roll 67, the slot die coater 61 coats the positive electrode slurry 19 on the positive electrode base material 700.

A coating thickness of the positive electrode slurry 19 may be adjusted by adjusting a gap with respect to the positive electrode base material 700.

The slot die coater 61 is configured to form the positive electrode portion 13 by applying the positive electrode slurry 19 between the insulating material 17 on both sides formed on the positive electrode base material 700.

The slot die coater 61 has an advantage of fast coating speed and easy adjustment of coating thickness.

The second drying furnace 70 is disposed at the rear of the second coating unit 60.

In the present exemplary embodiment, in the same way as in the first drying furnace 50, the second drying furnace 70 heats the positive electrode base material 700 coated with the positive electrode slurry 19 in the gel-state, so as to dry the positive electrode slurry 19.

The second drying furnace 70 includes a heating chamber 71, and while the positive electrode base material 700 passes through the heating chamber 71, the positive electrode slurry 19 in the gel-state is dried by high temperature wind inflowing through a duct 73.

While the positive electrode base material 700 passes through the second drying furnace 70, the positive electrode slurry 19 is dried to form the positive electrode portion 13.

The second drying furnace 70 may be formed in a known configuration, and a detailed description thereof will be omitted.

By the above described process, a positive electrode film 90 formed by the positive electrode base material 700 coated with the insulating material 17 and the positive electrode slurry 19 is formed.

Finally, the re-winder 80 is disposed at the rear of the second drying furnace 70.

The re-winder 80 recollects the positive electrode film 90 by winding the positive electrode film 90 into the form of a roll.

The roll wound by the re-winder 80 may be transferred to a subsequent process, where the positive electrode film 90 is cut into a predetermined size, and the positive electrode base material 700 corresponding to the insulating portion 11 is notched to form the lead portion 10.

An exemplary method for manufacturing a positive electrode 7 by using such a system for manufacturing a positive electrode is as follows.

Figure 6:
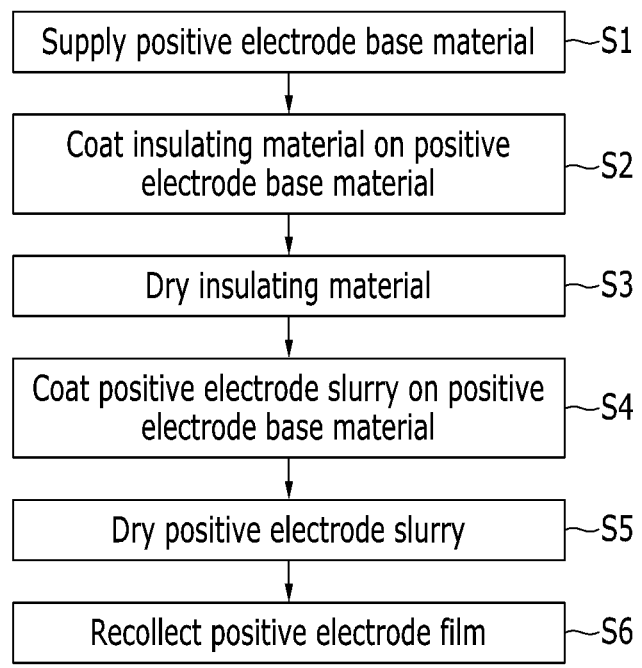
FIG. 6 is a flowchart showing a method for manufacturing a positive electrode according to an exemplary embodiment of the present invention.

FIG. 6 is a flowchart showing a method for manufacturing a positive electrode according to an exemplary embodiment of the present invention.

Referring to FIG. 6, at step S1, the positive electrode base material 700 wound on the unwinder 20 is unwound and transferred to the first coating unit 30 through a plurality of rollers.

Subsequently at step S2, by the first coating unit 30, the insulating material 17 is coated at predetermined positions on both sides of the positive electrode base material 700 with respect to the transfer direction D of the positive electrode base material 700.

At this time, the gravure roll 36 immersed in the insulating material 17 accommodated in the pan 31 rotates, and the insulating material 17 is taken on the coating surface 38 formed on the exterior circumference of the gravure roll 36.

Then, the gravure roll 36 is contacted with the positive electrode base material 700.

Thereby, the insulating material 17 is coated at the predetermined positions of the positive electrode base material 700 corresponding to the coating surfaces 38 by the rotation of the gravure roll 36.

At this time, the predetermined positions may be between the lead portions 10 formed at both ends of the positive electrode 7 and the positive electrode portion 13 formed at the central portion of the positive electrode 7 (refer to FIG. 2).

It may be understood that the lead portion 10 may be formed by notching end portions of the positive electrode base material 700, and the positive electrode portion 13 may be formed by drying after coating the positive electrode slurry 19.

Subsequently at step S3, the insulating material 17 is dried to form the insulating portion 11, while passing the positive electrode base material 700 through the first drying furnace 50.

Subsequently at step S4, by the second coating unit 60, the positive electrode slurry 19 is coated between the insulating portions 11 of the positive electrode base material 700 that has passed the first drying furnace 50.

At this time, the coating thickness may be set by adjusting a gap between the positive electrode base material 700 and the slot die coater 61.

The positive electrode slurry 19 is supplied to the positive electrode base material 700 through the internal passage 63 of the slot die coater 61, and the positive electrode slurry 19 is coated on the positive electrode base material 700 through the nozzle 65.

Subsequently at step S5, while passing the positive electrode base material 700 through the second drying furnace 70, the positive electrode slurry 19 is dried to form the positive electrode portion 13, thereby forming the positive electrode film 90.

Finally at step S6, the positive electrode film 90 that has passed through the second drying furnace 70 is transferred through a plurality of rollers, and is recollected by the re-winder 80.

The re-winder 80 wound with the positive electrode film 90 may be transferred to subsequent processes, where the positive electrode film 90 may be cut to a certain length, and the positive electrode base material 700 corresponding to the outside of the insulating portion 11 may be notched to the lead portion 10.

Therefore, according to a system and method for manufacturing a positive electrode for a secondary battery according to an exemplary embodiment, the insulating material 17 in a liquid state is applied on the positive electrode base material 700 by the first coating unit 30, the insulating material 17 is dried to form the insulating portion 11 by the first drying furnace 50, and then the positive electrode slurry 19 is applied between the insulating portions 11, thereby preventing mixing of the insulating material 17 and the positive electrode slurry 19.

In addition, according to a system and method for manufacturing a positive electrode for a secondary battery according to an exemplary embodiment, the gravure roll 36 is employed to the first coating unit 30, thereby providing an advantage of easy control of the size of the insulating portion 11 that requires preciseness.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A system for manufacturing a positive electrode for a secondary battery, the system comprising:
   an unwinder wound with a positive electrode base material;
   a first coating unit configured to coat an insulating material at predetermined positions about widthwise edges of the positive electrode base material with respect to a transfer direction of the positive electrode base material supplied from the unwinder;
   a first drying furnace configured to dry the insulating material by heating the positive electrode base material coated with the insulating material;
   a second coating unit configured to coat a positive electrode slurry on the positive electrode base material supplied from the first drying furnace in a region between the insulating material formed at both sides of the predetermined positions about widthwise edges of the positive electrode base material; and
   a second drying furnace configured to heat and dry the positive electrode base material coated with the insulating material and the positive electrode slurry.

2. The system of claim 1, wherein the predetermined positions on the positive electrode base material to be coated with the insulating material are positioned between an electrode portion formed at a central portion of the positive electrode and lead portions formed at both ends of the positive electrode.

3. The system of claim 1, wherein the second coating unit comprises a slot die coater configured to coat the positive electrode slurry on the positive electrode base material, wherein the positive electrode slurry is configured to be supplied through an internal passage and coated through a nozzle.

4. The system of claim 3, wherein the slot die coater is configured to set a coating thickness of the positive electrode slurry by adjusting a gap with respect to the positive electrode base material and to form a positive electrode portion by applying the positive electrode slurry between the insulating material formed on both sides of the positive electrode base material.

5. The system of claim 1, further comprising a re-winder configured to recollect a positive electrode film formed by coating and drying the insulating material and the positive electrode slurry on the positive electrode base material by winding the positive electrode film into a roll.

6. The system of claim 1, wherein the positive electrode base material comprises an aluminum foil.

7. A system for manufacturing a positive electrode for a secondary battery, the system comprising:
   an unwinder wound with a positive electrode base material;
   a first coating unit configured to coat an insulating material at predetermined positions about widthwise edges of the positive electrode base material with respect to a transfer direction of the positive electrode base material supplied from the unwinder;
   a first drying furnace configured to dry the insulating material by heating the positive electrode base material coated with the insulating material;
   a second coating unit configured to coat a positive electrode slurry on the positive electrode base material supplied from the first drying furnace in a region between the insulating material formed at both sides of the predetermined positions about widthwise edges of the positive electrode base material; and
   a second drying furnace configured to heat and dry the positive electrode base material coated with the insulating material and the positive electrode slurry;
   wherein the first coating unit comprises:
     a pan configured to store the insulating material in a liquid state; and
     a gravure roll rotatably disposed within the pan through a rotation shaft, and having coating surfaces formed on an exterior circumference of the gravure roll, the coating surfaces configured to transfer the insulating material to the positive electrode base material to form an insulating portion.

8. The system of claim 7, wherein the gravure roll is installed to be immersed in the insulating material within the pan and is configured to form the coating surfaces at each exterior circumference at both sides of the gravure roll.

9. The system of claim 8, wherein the coating surfaces are symmetrically formed with respect to a center of the gravure roll through intaglio molding.

10. The system of claim 7, further comprising:
    a storage tank configured to supply the insulating material to the pan;
    a mixer disposed in the storage tank and configured to mix the insulating material;
    a supply hose connecting the storage tank and the pan; and
    an adjustment valve installed on the supply hose.

11. The system of claim 7, wherein the predetermined positions on the positive electrode base material to be coated with the insulating material are positioned between an electrode portion formed at a central portion of the positive electrode and lead portions formed at both ends of the positive electrode.

12. The system of claim 7, wherein the second coating unit comprises a slot die coater configured to coat the positive electrode slurry on the positive electrode base material, wherein the positive electrode slurry is configured to be supplied through an internal passage and coated through a nozzle.

13. The system of claim 12, wherein the slot die coater is configured to set a coating thickness of the positive electrode slurry by adjusting a gap with respect to the positive electrode base material and to form a positive electrode portion by applying the positive electrode slurry between the insulating material formed on both sides of the positive electrode base material.

14. The system of claim 7, further comprising a re-winder configured to recollect a positive electrode film formed by coating and drying the insulating material and the positive electrode slurry on the positive electrode base material by winding the positive electrode film into a roll.

15. The system of claim 7, wherein the positive electrode base material comprises an aluminum foil.

16. A method of using a system to manufacture a positive electrode for a secondary battery, wherein the system comprises an unwinder wound with a positive electrode base material, a first coating unit, a plurality of rollers between the unwinder and the first coating unit, a first drying furnace, a second coating unit, and a second drying furnace, the method comprising:
   unwinding the positive electrode base material wound on the unwinder and transferring the positive electrode base material to the first coating unit through the plurality of rollers;
   using the first coating unit to coat an insulating material at predetermined positions about widthwise edges of the positive electrode base material with respect to a transfer direction of the positive electrode base material supplied from the unwinder;

using the first drying furnace to dry the insulating material by heating the positive electrode base material coated with the insulating material;

after using the first drying furnace to dry the insulating material, using the second coating unit to coat a positive electrode slurry on the positive electrode base material supplied from the first drying furnace in a region between the insulating material formed at both sides of the predetermined positions about widthwise edges of the positive electrode base material; and using the second drying furnace to heat and dry the positive electrode base material coated with the insulating material and the positive electrode slurry.

17. The method of claim 16, wherein using the first coating unit to coat an insulating material at predetermined positions comprises:

rotating a gravure roll immersed in the insulating material accommodated in a pan so as to form the insulating material on coating surfaces formed on an exterior circumference of the gravure roll; and coating the insulating material at the predetermined positions of the positive electrode base material corresponding to the coating surfaces by the rotation of the gravure roll through a contact between the gravure roll and the positive electrode base material.

18. The method of claim 17, wherein the coating surfaces are symmetrically formed with respect to a center of the gravure roll through intaglio molding.

19. The method of claim 16, wherein using the second coating unit to coat a positive electrode slurry on the positive electrode base material comprises:

adjusting a gap between the positive electrode base material and a slot die coater; and supplying the positive electrode slurry to the positive electrode base material through an internal passage of the slot die coater so as to coat the positive electrode slurry on the positive electrode base material through a nozzle.

20. The method of claim 16, further comprising using a re-winder to recollect a positive electrode film formed by coating and drying the insulating material and the positive electrode slurry on the positive electrode base material by winding the positive electrode film into a roll.

* * * * *